June 2, 1925.
L. D. KROFF
1,540,735
AUTOMOBILE LICENSE PLATE ATTACHING DEVICE
Filed May 7, 1923
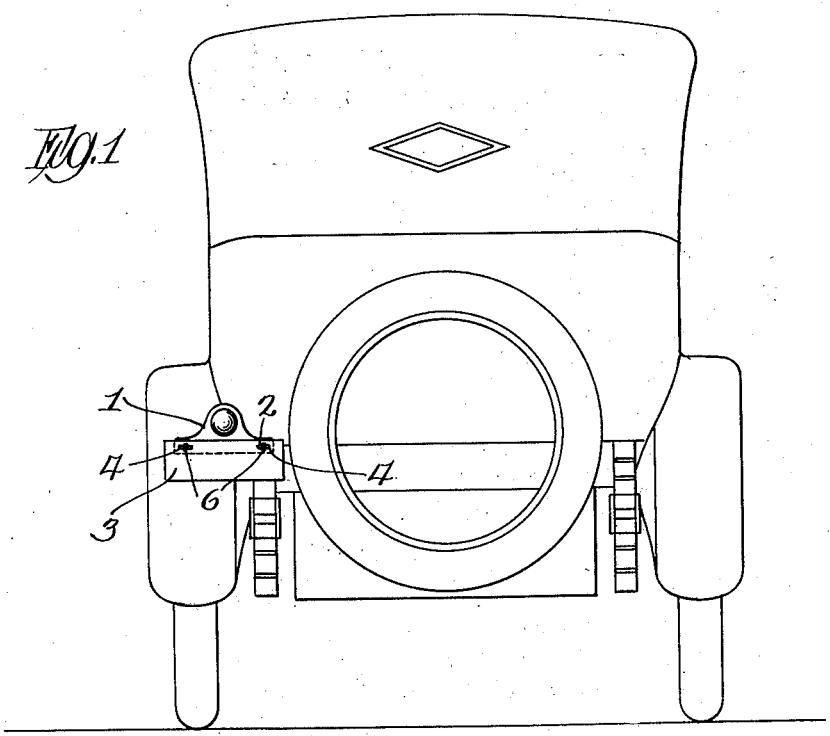
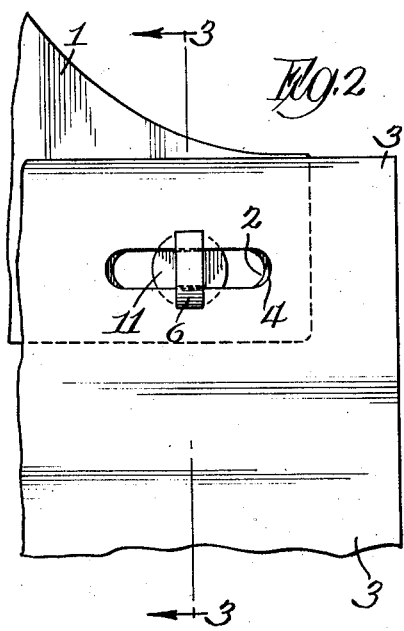
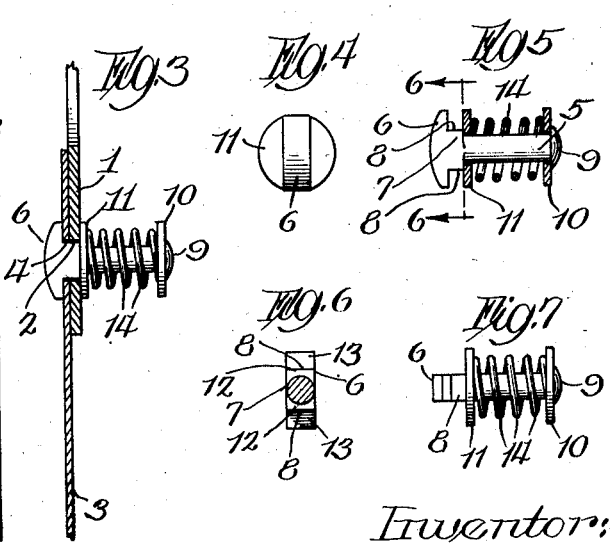
Inventor:
Leonard D. Kroff Patented June 2, 1925.

1,540,735

UNITED STATES PATENT OFFICE.

LEONARD D. KROFF, OF STERLING, ILLINOIS.

AUTOMOBILE LICENSE-PLATE-ATTACHING DEVICE.

Application filed May 7, 1923. Serial No. 637,044.

*To all whom it may concern:*

Be it known that I, LEONARD D. KROFF, a citizen of the United States, and resident of Sterling, Whiteside County, Illinois, have invented a certain new and useful Improvement in Automobile License-Plate-Attaching Devices, of which the following is a specification.

This invention relates to devices for holding automobile license plates in position on the brackets ordinarily employed for this purpose.

Generally stated, the object of the invention is to provide a simple and comparatively inexpensive device which can be applied for this purpose without taking it apart, so that the device can be sold as a structural unit which cannot be taken apart, but which may be applied easily and conveniently to fasten a license plate in position on the automobile, the device having improved means for holding it against turning or rotating after being adjusted in position to hold the plate in place.

It is also an object to provide certain details tending to increase the general efficiency and desirability of an automobile license plate fastening device of this particular construction.

To the foregoing and other useful ends the invention consists in matters hereinafter set forth and claimed and shown in the accompanying drawings in which—

Figure 1 is a rear elevation of an automobile, showing a license plate supported by means of fastening devices embodying the principles of the invention.

Figure 2 is an enlarged view of the right hand portion of the license plate, and the adjacent parts, as shown in Figure 1.

Figure 3 is a vertical section on line 3—3 in Figure 2.

Figure 4 is an end elevation of said fastening device, on the same scale as shown in Figures 2 and 3.

Figure 5 is a longitudinal section of said device.

Figure 6 is a transverse section on line 6—6 in Figure 5.

Figure 7 is a view looking down on the device shown in Figure 5.

As thus illustrated, the invention comprises a bracket 1 of any suitable character having horizontal slots 2 therein for the reception of the fastening devices. The license plate 3 has similar slots 4 to register with the slots of the bracket.

The fastening device comprises a straight shank 5 provided at its front end (the end which will show on the face of the license plate) with a laterally flattened and vertically disposed head 6, which head has its inner side provided with a squared portion 7 the sides of which are flush with the round or cylindrical shank 5, but the upper and lower shoulders 8 of which are some distance above and below the top and bottom of the shank 5, as shown in Figures 3 and 5 of the drawings. In other words, the distance between the shoulders 8 is greater than the diameter of the cylindrical shank 5, and the latter has its rear end (the end which is concealed behind the bracket 1 when the license plate is secured in place) formed with a riveted overhead 9 to hold the washer 10 permanently in position thereon. A similar washer 11 bears against the shoulders 12 which are adjacent the shoulders 8, and at right angles thereto, these shoulders 12 being formed by the end of the squared portion 7 previously described. Thus the portion 7 serves as a spacer between the inner bearing surfaces 13 of the head 6 and the washer 11, and a coil spring 14 is interposed between the washers 10 and 11 in the manner shown.

In use, the license plate is adjusted in position, as shown, and then the two devices, one for each end of the plate, are placed back of the bracket and pushed forward through the slots, head first, until the squared portions 7 of the two devices are beyond the face or outer surface of the license plate. The washer 11 of each device will bear against the bracket 1, so that the spring 14 will be compressed, it being observed that the diameter of the shank 5 is the same as the lateral thickness of the head 6 and the squared portion 7, as previously explained, so that when the head 6 is horizontal it can be passed through the slots 2 and 4 of the bracket and the license plate. When the portion 7 is some distance outside of the face of the license plate, the person applying the device will then turn the device around until the head 6 is vertical, and by then releasing the pressure the spring 14 will draw the shoulders 12 of the portion 7 back against the edges of the slot 4 of the license plate, so that the latter will be clamped in position as shown in Figures 1, 2 and 3 of the drawings. It will be seen that the distance between the shoulders 8 is just a little less than the width of the slots 2 and 4, so that when the device is in the position shown in Figure 3 these shoulders 8 prevent it from turning or rotating in the slots, whereby the license plate is securely held in place. The only thing that is visible on the face of the license plate is the small head 6 of each fastening device, and the spring 14 and other parts are concealed behind the bracket plate. Thus the portion 7 which is rigid with the shank 5 and with the head 6 engages the edges of the slots 2 and 4 to prevent the device from rotating therein, after the license plate is secured in place.

To release the plate, pressure must be applied to the head 9 of the device, so as to force the squared portion 7 out of the slots and then the device is given a quarter rotation until the head 6 is parallel with the two slots, and by releasing the pressure the device will then move through the slots and out of engagement with the edges thereof and will thus release the license plate.

It will be seen that the shoulders 8 and 8 are formed by axial extensions of the head 6, whereby these shoulders face outwardly in opposite directions, thereby to engage the opposing edges of both slots in the manner shown and described.

Thus it will be seen that the head 6 has upper and lower ends, but these ends are interchangeable, so to speak, inasmuch as either end may be uppermost when the head is crosswise of the slots. In other words, the head of the fastening device has two operative positions, for it is operative with either end of the head 6 uppermost, inasmuch as the portions forming the shoulders 8 are duplicates, and either shoulder may engage the upper edges of the slots, and either end of the head 6 may be at either side of the slots, when the plate is fastened to the bracket. Moreover, the head 6 is so formed that the spring 14 can only be compressed by pressure exerted on the riveted overhead 9, at the back of the bracket, and in this way the heads 6 of the fastening devices are not only comparatively inconspicuous on the face of the plate, but are also not adapted for use in removing the plate, as the endwise movement of the two devices, necessary for the removal of the plate, can only be accomplished by pressure on the rear ends of the two devices, practically, unless some tool be used in engagement with the head 6 to effect the adjustment necessary for the removal of the plate. In any event, as stated, either shoulder 8 may engage the upper edges of the slots in the plate and bracket, and either shoulder may engage the lower edges of these slots, for the fastening device is operative in either position, and in either position the shoulders 8 are operative to prevent rotation of the device and accidental loosening of the plate.

What I claim as my invention is—

1. In a structure of the class described, comprising a bracket having a slot, and a plate to be supported by said bracket, having a slot to register with the first mentioned slot, the combination therewith of a shank having an integral and laterally flattened head for insertion through said slots, said head being adapted to extend crosswise of the slots, with either end of the head at either side of the slots, duplicate portions adjacent the head and forming flat shoulders facing outward in opposite directions to bear against the edges of said slots, after the inner side of said head is drawn back against the face of the plate, so that with the head in either position thereof the shank is prevented from rotating by engagement of said shoulders with said edges of the slots, a slidable washer on the shank to bear against the bracket, a coil spring bearing against said washer at the back of said bracket, so that said bracket and plate are clamped tightly between said washer and head, and means permanently held on said shank to hold the spring in position thereon.

2. A structure as specified in claim 1, said shoulders being provided by a squared portion of said head, the lateral thickness of said head and its squared portion being substantially the same as the diameter of said shank, but the distance between said shoulders being greater than said diameter, and the width of said slots being less than the distance between said shoulders.

3. A structure as specified in claim 1, said shank and head and shoulders being integral, and the other end of said shank having integral means to prevent removal of said spring and washer, with another washer interposed between said integral means and said spring, this second washer forming the permanently held spring retaining means of claim 1, substantially as shown and described.

4. A structure as specified in claim 1, said shoulders being flat and parallel with each other, the two shoulders being disposed at right angles to the inner bearing surface of said head, and other shoulders at right angles to said first mentioned shoulders to engage said washer.

LEONARD D. KROFF.